United States Patent [19]

Porter

[11] Patent Number: 4,815,635
[45] Date of Patent: Mar. 28, 1989

[54] CYCLIST WATER SUPPLY APPARATUS

[76] Inventor: Willie E. Porter, 3271 Louise St., Lynwood, Calif. 90262

[21] Appl. No.: 120,664

[22] Filed: Nov. 16, 1987

[51] Int. Cl.[4] ............................................. B62J 39/00
[52] U.S. Cl. .................................. 222/136; 222/144.5; 222/609; 222/180; 222/192; 280/288.4
[58] Field of Search ............... 222/136, 609, 610, 175, 222/144.5, 145, 180, 372, 192; 224/35, 32 R; 280/289 H, 289 R; 239/33, 146

[56] References Cited

U.S. PATENT DOCUMENTS

| | | | |
|---|---|---|---|
| 581,767 | 5/1897 | Powers | 222/610 X |
| 4,095,812 | 6/1978 | Rowe | 280/289 R |
| 4,204,614 | 5/1980 | Reeve | 222/383 X |
| 4,274,566 | 6/1981 | Rowe | 280/289 R X |
| 4,526,298 | 7/1985 | Boxer et al. | 222/175 X |
| 4,681,244 | 7/1987 | Geddie | 222/175 X |

Primary Examiner—Joseph J. Rolla
Assistant Examiner—Nils E. Pedersen
Attorney, Agent, or Firm—Leon Gilden

[57] ABSTRACT

A water supply apparatus is utilized in conjunction with a bicycle to enable a rider to receive either a spray of cooling water or a stream for drinking purposes. A diaphragm-type pump supplies the water. Plural reservoirs enable a plurality of liquids to be transported and utilized, such as water for cooling the rider and a sucrose solution for energy.

4 Claims, 1 Drawing Sheet

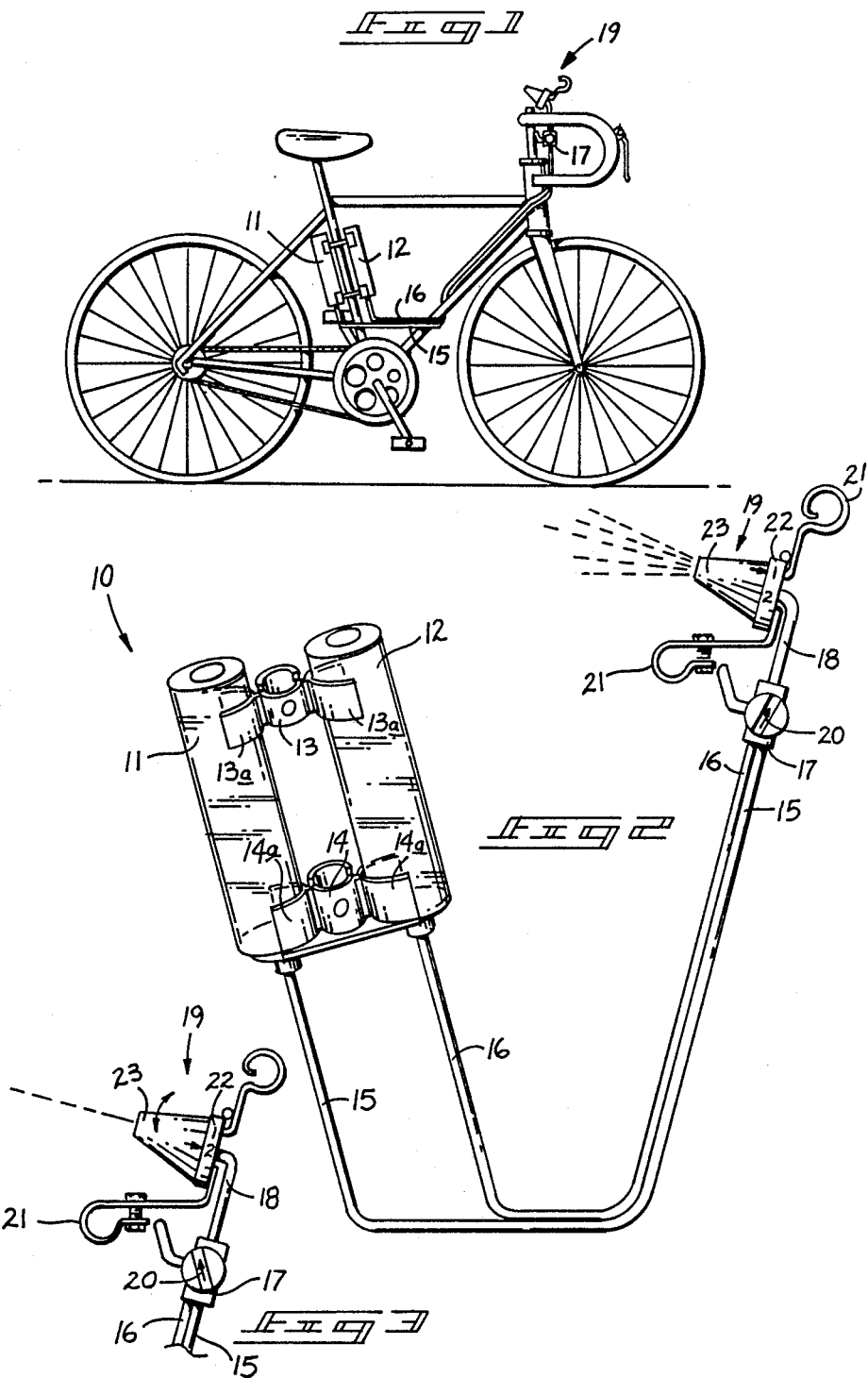

CYCLIST WATER SUPPLY APPARATUS

BACKGROUND OF THE INVENTION

1. Field of the Invention

The instant invention relates to water supply apparatus and more particularly pertains to a new and improved cyclist water supply apparatus that enables the delivering a liquid to a rider of a bicycle from a plurality of reservoirs selectively. Additionally, the liquid may be imparted to the rider in the form of a stream for drinking or a spray for cooling.

2. Description of the Prior Art

The use of water supply apparatus in combination with bicycles is well known in the prior art. As may be appreciated, these devices have either been of a single reservoir system requiring manual manipulation of the liquid supply to provide a rider of a bicycle a refreshener or the like, or they have been limited in the manner of delivering a liquid to a bicyclist. In this connection, there have been several attempts to develop water supply apparatus for use in combination with bicycles which may be easily and efficiently manipulated to provide a rider with liquid refreshment. For example, U.S. Pat. No. 4,095,812 to Rowe sets forth the use of a reservoir securable to a bicycle wherein an elongated delivery tube is removable from the confines of a closure whereby a bicyclist may utilize the retractable tube as a drinking straw to receive fluid from the associated reservoir. The use of a single reservoir by Rowe as well as a rather awkward means of extracting fluid from the reservoir limits the convenience and applicability of the patent to provide a variety of liquids in a plurality of forms as available by the instant invention.

U.S. Pat. No. 4,150,682 to Howarth sets forth the use of a water supply that may be imparted onto the lenses of goggles worn by a motorcyclist in a spray form to clear the goggles of debris in a racing situation. A pressurized tank enables imparting of a spray onto the goggles of the motorcyclist wherein the limited applicability and rather cumbersome nature of the apparatus limits its use on a bicycle that normally requires light weight components for a liquid refreshment system in a typical use situation.

U.S. Pat. No. 4,274,566 to Rowe comprises essentially an improvement over the prior U.S. Pat. No. 4,095,812 in providing a reel-type supply of the flexible drinking tube for use in a bicycle frame environment. While a somewhat improvement in the retraction of the flexible drinking tube, the patent continues to fail in providing a means of supplying alternative fluid sources in either a spray or stream form to a bicycle rider, as does the instant invention.

U.S. Pat. No. 4,441,638 to Shimano is a typical representation of a water supply bottle as used by bicyclists wherein the configuration of the bottle in providing a streamlined shape in the Shimano patent fails to address the problem of fluid supply during the course of riding to a cyclist.

U.S. Pat. No. 4,455,911 to Kusisto provides a somewhat novel means of imparting a cooling source of air to a cyclist wherein an air flow chamber is driven by means of the forward wheel to impart a coolant air flow to a bicycle rider. While a variation of a means to impart a different form of fluid flow to a cyclist, the device fails to provide the multiple fluid supply selectively utilized by a cyclist to achieve either a cooling effect by a water spray or a refreshment means by use of a fluid stream.

As such, it may be appreciated that there is a continuing need for a new and improved cyclist water supply apparatus which addresses both the problem of multiple fluid storage, compactness, and versatility, and in this respect, the present invention substantially fulfills this need.

SUMMARY OF THE INVENTION

In view of the foregoing disadvantages inherent in the known types of cyclist water supply apparatus now present in the prior art, the present invention provides an cyclist water supply apparatus wherein the same may be completely mounted and positioned for use on a bicycle frame and may be further easily and efficiently utilized during periods of a bicycling endeavor to provide a cyclist with either a spray or stream of liquid from selective sources. As such, the general purpose of the present invention, which will be described subsequently in greater detail, is to provide a new and improved cyclist water supply apparatus which has all the advantages of the prior art cyclist water supply apparatus and none of the disadvantages.

To attain this, the present invention comprises a plurality of reservoirs to selectively supply fluid from either reservoir by means of a valve member to deliver fluid from selective sources to a nozzle that is rotatable to impart either a stream or spray onto a cyclist by means of a diaphragm pump member to facilitate the flow of fluid.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cyclist water supply apparatus which has all the advantages of the prior art cyclist water supply apparatus and none of the disadvantages.

It is another object of the present invention to provide a new and improved cyclist water supply apparatus which may be easily and efficiently manufactured and marketed.

It is a further object of the present invention to provide a new and improved cyclist water supply apparatus which is of a durable and reliable construction.

An even further object of the present invention is to provide a new and improved cyclist water supply apparatus which is susceptible of a low cost of manufacture with regard to both materials and labor, and which accordingly is then susceptible of low prices of sale to the consuming public, thereby making such cyclist water supply apparatus economically available to the buying public.

Still yet another object of the present invention is to provide a new and improved cyclist water supply apparatus which provides in the apparatuses and mehtods of the prior art some of the advantages thereof, while simultaneously overcoming some of the disadvantages normally associated therewith.

Still another object of the present invention is to provide a new and improved cyclist water supply apparatus wherein plural fluid reservoirs enable a selective liquid source deliverable to a rider by means of a valve.

Yet another object of the present invention is to provide a new and improved cyclist water supply apparatus wherein a rotatable nozzle enables either a stream or spray to be imparted to a rider.

Even still another object of the present invention is to provide a new and improved cyclist water supply apparatus wherein a diaphragm pump inserts a fluid to a rider of a bicycle.

These together with other objects of the invention, along with the various features of novelty which characterize the invention, are pointed out with particularlity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view in elevation of the instant invention associated with a typical bicycle.

FIG. 2 is an isometric illustration of the present invention illustrating the various parts, their configuration, and relationship.

FIG. 3 is an orthographic view taken in elevation of the nozzle and associated valve structure illustrating the nozzle rotated to a stream imparting orientation.

DESCRIPTION OF THE PREFERRED EMBODIMENT

With reference now to the drawings, and in particular to FIG. 2 thereof, a new and improved cyclist water supply apparatus embodying the principles and concepts of the present invention and generally designated by the reference numeral 10 will be described.

More specifically, it will be noted that cyclist water supply apparatus 10 essentially comprises a first fluid supply reservoir 11 and a second fluid supply reservoir 12 securable to a conventional bicycle's "C" post by means of clamps 13 and 14 to surroundingly engage said post, as illustrated in FIG. 1 to secure said reservoirs thereto. Upper flange portions 13a and lower flange portions 14a directly secure said first and second supply reservoirs for providing a unitary arrangement. The flanges may, in a typical fashion, either adhesively be secured to said resevoirs 11 and 12 or frictionally engage same for attachment. The precise manner of securement of said reservoirs to said clamps 13 and 14 is non-essential but is only necessary to insure a secure unitized arrangement to enable the so-formed reservoirs to withstand the typical vibrations and bounces associated with bicycle riding.

A first supply conduit 15 is associated with first fluid supply reservoir 11 and a second supply conduit 16 is accordingly associated with a second fluid supply reservoir 12. Conduits 15 and 16 are preferably formed of a rigid material, be it either metallic or plastic-like, but of a preferably nonflexible nature to ensure its configurational integrity as it is associated with a typical bicycle frame in a serpentine fashion, as illustrated in FIG. 1;

The first and second supply conduits 15 and 16 are directed into a valve 17 of conventional construction that selectively associates either first supply conduit 15 or second supply conduit 16 with a main supply conduit 18. Main supply conduit 18 is itself preferably formed of a flexible material as the conduit 18 is fixedly secured to nozzle 19 which is in turn securable to a handle bar of a typical nozzle bicycle by a clamp means 21. As the nozzle 19 therefore will be directed through an arc of movement in its association with the handle bar of the bicycle, the main supply conduit 18 must either be flexible, which is preferred, or either rigid and pivotally connected in a fluidtight seal arrangement with valve 17. As the use of a flexible main supply conduit 18 is more ecoonomial, it is preferred that the pivotal connection to valve 17 is itself effective for use.

For ease of operation, a directional arrow 20 is integrally configured on valve 17 to provide an understanding to a user as to which supply line is being used, be it either 15 or 16. For example, FIG. 2 illustrates the arrow oriented to emanate from supply conduit 16 whereas FIG. 3 conversely has the arrow indicating a supply source derived from conduit 15.

Nozzle 19 has formed therein a conventional diaphragm pump, as is typically utilized with novel structures of this category, wherein pump handle 21 is manually manipulable to direct a flow of fluids from nozzle 19. Nozzle 19 is then itself positionable in a plurality of orientations illustrated as 1 and 2 on FIGS. 2 and 3 on base 22. Nozzles of this class are typically found on spray bottles to impart either a spray or stream of a variety of liquid but it is utilized in a unique fashion as currently described to illustrate that in position 1, as illustrated in FIG. 2, a spray of fluid will be provided by the activation of pump handle 21 whereas FIG. 3 illustrates a rotation of nozzle 19 by rotating cone 23 about an arc, as indicated by the associated arrow, to a position 2 whereupon manipulation of pump handle 21 produces a stream of liquid.

In use, reservoirs 11 and 12 may hold a plurality of liquids of different types, for example water may be provided in reservoir 11 and a sucrose solution may be provided in reservoir 12 whereby manuipulation of valve 17 enables either plain water or an energy supplement, such as a sucrose solution, to be obtained by a cyclist utilizing my invention. Furthermore, whereby when plain water is utilized, forward one portion 23 is rotatable to a position 1, as illustrated in FIG. 2, to impart a spray of coolant liquid onto the cyclist, as utilized to cool and refresh a cyclist during the course of a race or the like. Should an energy supplement be deemed desirable, a rotation of forward cone 23 to position 2, as illustrated in FIG. 3, enables a stream to be imparted whereby the cyclist may enable the stream to be directed into his mouth for use as a refreshment.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cyclist refreshment appartus for use in combination with a bicycle comprising, reservoir means for containing and separating plural liquids, and valve means operably associated with said reservoir means for selectively utilizing one of said plural liquids, and nozzle means operably associated with said valve means for selectively directing one of said liquids, and force means to direct one of said liquids from said reservoir means outwardly of said nozzle means, and wherein said valve means is operably associated with said reservoir means by plural conduits for directing each of a plurality of said plural liquids, and wherein said reservoir means includes a plurality of separate elongate reservoirs directing a liquid through each of said conduit means, and said elongate reservoirs are clamped together by upper and lower clamp members, and each of clamp members are formed with spaced clamps to secure said elongate reservoir toghether and each of said clamp members are further formed with a central clamp portion intermediate with spaced clamps to secure said reservoir to an elongate tubular frame portion of a bicycle;

said upper clamp member aligned and overlying said lower clamp member in a spaced relationship thereto, and wherein said conduits are formed of rigid tubing material to maintain a pre-set configuration in association with said bicycle, and wherein said valve means is operably associated with said nozzle means by means of a flexible conduit connecting said nozzle means to said valve means.

2. A cyclist refreshment appartus as set forth in claim 1, wherein said nozzle means is formed with a rotatable forward nose portion to vary the outwardly directed fluid flow from a stream to a spray application.

3. A cyclist refreshment appartus as set forth in claim 1 wherein said nozzle means has formed thereto a clamp for securement to a bicycle handle bar.

4. A cyclist refreshment apparatus as set forth in claim 1 wherein said force means comprises a diaphragm plunger operative by means of a manually manipulable handle.

* * * * *